United States Patent
Healey

(10) Patent No.: US 12,203,572 B2
(45) Date of Patent: Jan. 21, 2025

(54) ARRANGEMENTS FOR BLANKING A COUPLING MEMBER

(71) Applicant: LPW Technology Ltd, Widnes (GB)

(72) Inventor: Callum Healey, Widnes (GB)

(73) Assignee: LPW Technology Ltd, Widnes (GB)

(*) Notice: Subject to any disclaimer, the term of this patent is extended or adjusted under 35 U.S.C. 154(b) by 9 days.

(21) Appl. No.: 18/015,027

(22) PCT Filed: Jul. 6, 2021

(86) PCT No.: PCT/GB2021/051707
§ 371 (c)(1),
(2) Date: Jan. 6, 2023

(87) PCT Pub. No.: WO2022/008891
PCT Pub. Date: Jan. 13, 2022

(65) Prior Publication Data
US 2023/0265949 A1 Aug. 24, 2023

(30) Foreign Application Priority Data
Jul. 7, 2020 (GB) .................................. 2010395

(51) Int. Cl.
*F16L 23/10* (2006.01)
*F16L 55/105* (2006.01)
*F16L 55/115* (2006.01)

(52) U.S. Cl.
CPC ............. *F16L 23/10* (2013.01); *F16L 55/105* (2013.01); *F16L 55/1157* (2013.01)

(58) Field of Classification Search
CPC ...... F16L 23/10; F16L 55/115; F16L 55/1157; F16L 55/1286

(Continued)

(56) References Cited

U.S. PATENT DOCUMENTS 4,237,936 A * 12/1980 Lollis ............... F16L 55/115
138/90
4,288,001 A * 9/1981 Lankston ............ B01J 3/03
220/319

(Continued)

FOREIGN PATENT DOCUMENTS

EP      3520932 A1   8/2019
WO   2006/101324 A1   9/2006

OTHER PUBLICATIONS

Patent Cooperation Treaty: International Search Report and Written Opinion for PCT/GB2021/051707 dated Sep. 27, 2021; 13 pages.

*Primary Examiner* — David Bochna
(74) *Attorney, Agent, or Firm* — Schwabe, Williamson & Wyatt, P.C.

(57) ABSTRACT

An assembly 10 includes a coupling member 12 having a first annular, radial connection flange 22 and a blanking cap 14 comprising a disc-like member 30 which defines a second, corresponding annular, radial connection flange 34. The connecting flanges are clamped together by a clamp (16) with a seal member 18 in-between. The blanking cap comprises a pair of safety lugs 62 attached to the disc-like member which each extend about an outer circumferential periphery of the first connection flange 22. Each safety lug has an abutment 68 for engagement with the first connection flange to limit axial movement of the disc-like member away from the coupling member. The lugs 62 prevent the blanking cap from flying off in the event the clamp is released whilst the interior of the coupling member is pressurised. The lugs 62 may each have a stop member 66 which defines the abutment and which may take the form of an elongate curved member extending circumferentially about an axis of the connection flanges. The clamp may be tri-clamp.

17 Claims, 6 Drawing Sheets

(58) Field of Classification Search
USPC .................. 285/409, 410, 411, 367, 901, 1
See application file for complete search history.

(56) References Cited

U.S. PATENT DOCUMENTS

| | | | | |
|---|---|---|---|---|
| 4,730,853 | A * | 3/1988 | Gjessing | F16L 37/002 |
| | | | | 285/901 |
| 4,778,202 | A * | 10/1988 | Schulke | F16L 47/14 |
| | | | | 285/911 |
| 6,059,136 | A * | 5/2000 | Lin | F16L 55/115 |
| | | | | 220/212.5 |
| 6,085,793 | A * | 7/2000 | Mayhew | F16L 55/115 |
| | | | | 138/94.5 |
| 7,152,630 | B2 * | 12/2006 | Krywitsky | F16L 55/1007 |
| | | | | 285/901 |
| 8,820,565 | B2 * | 9/2014 | Akhund | F16J 13/10 |
| | | | | 292/256.65 |
| 8,910,814 | B2 * | 12/2014 | Ferraresi | F16J 13/065 |
| | | | | 285/420 |
| 10,550,940 | B2 * | 2/2020 | Kozak | F16L 55/115 |
| 11,719,341 | B2 * | 8/2023 | Mitchell | F16L 55/115 |
| | | | | 220/315 |
| 11,859,751 | B2 * | 1/2024 | Kozak | F16L 55/115 |
| 2005/0005984 | A1 | 1/2005 | Elbich | |
| 2012/0043754 | A1 | 2/2012 | Gadawski | |
| 2014/0069133 | A1 | 3/2014 | Becker | |
| 2018/0104149 | A1 * | 4/2018 | Nowak | F16L 55/115 |

* cited by examiner

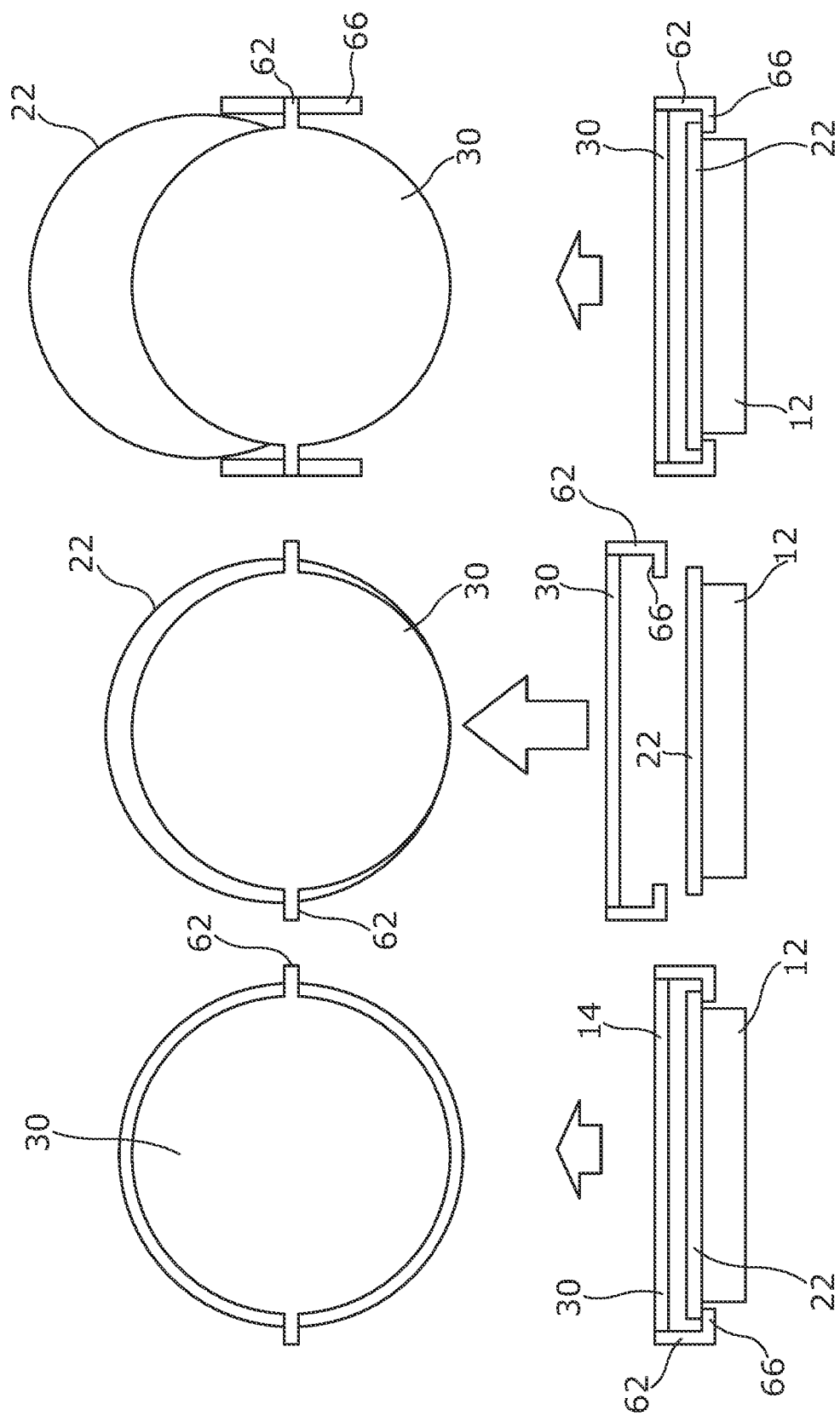

ARRANGEMENTS FOR BLANKING A
COUPLING MEMBER

CROSS-REFERENCE TO RELATED
APPLICATION

The present application is a national phase entry under 35 U.S.C. § 371 of International Application No. PCT/GB2021/051707, filed Jul. 6, 2021 which designates the United States of America, which claims priority to GB Application No. 2010395.8, filed Jul. 7, 2020, the entire disclosures of each of these applications are hereby incorporated by reference in their entireties and for all purposes.

TECHNICAL FIELD OF THE INVENTION

The present invention relates to arrangements for blanking a flanged coupling member defining a flow path. It relates especially, but not exclusively, to arrangements for blanking a port in a pressurised system, such as a pressurised container.

BACKGROUND TO THE INVENTION

When forming a releasable connection in a flow path for a flowable material, it is known to use a coupling comprising a pair of coupling members having overlying annular connection flanges which are clamped together with a seal member in-between. Often, the connection flanges are clamped together using a clamp which has a pair of curved arms. The arms are recessed and each is arranged to receive a circumferential extent of the overlying connection flanges. The connection flanges have opposed radial sealing faces against which the seal member abuts and outwardly directed radial faces which are tapered so that the flanges get narrower in an axial direction towards their outer diameter. The clamp arms can be opened as they are located about the flanges and then secured together in position. As the clamp is tightened, the arms are drawn together radially so that the flanges are pressed further into the recesses in the arms. This moves the flanges closer together axially due to the taper, compressing the seal member and forming a fluid tight seal. In one known arrangement, the clamp is a split-ring clamp and the arms are hinged together at one end with a catch mechanism for releasably connecting the other ends. In use, the catch is released to allow the arms to be opened up so that the clamp can be positioned about the overlying connection flanges and the catch re-engaged and tightened to draw the other ends of the hinged arms towards each other clamping the flanges and the seal member together. An example of this type of coupling is the so called "tri-clamp" union, in which the coupling members are often referred to as ferrules. Tri-clamp unions can be used to form a temporary coupling in a range of applications, such as for coupling the ends of conduits or coupling a conduit or other device to a port on a container. It is known, for example, to use a tri-clamp union to make a coupling with an inlet port on a container for holding powder, including specialised powders such as those used in additive layer manufacturing (ALM) or additive manufacturing (AM). Often such containers are pressure vessels in which the powder is held together with a pressurised gas.

It is also known to use a blanking cap to close off a coupling member when not in use. For example, where a port in a container is not being used, a blanking cap may be secured to the port ferrule to close the port. The blanking cap is typically a disc-like member have an outer circumferential region which defines a connection flange corresponding to that on the port ferrule. A clamp is used to clamp the connection flange on the blanking cap to the connection flange on the port ferrule with a seal member in-between. This arrangement for closing off a port generally works well and allows the container to be used without anything being connected to the port. However, a problem with the existing arrangement arises when used to close of a coupling on a pressurised container. Should a user release the clamp whilst the container is pressurised, the cap may fly off, potentially causing injury.

There is a need then to provide a solution to the above problem.

There is a need to provide an alternative arrangement for blanking a coupling member which overcomes, or at least mitigates, at least one drawback of the known arrangements.

The is also a need to provide an assembly comprising a coupling member and a blanking cap which overcomes, or at least mitigates, at least one drawback of the known assemblies.

There is a further need to provide an alternative blanking cap for blanking off a coupling member which overcomes, or at least mitigates, at least one drawback of the known blanking cap.

There is a need in particular to provide an alternative blanking cap for temporality closing off a port in a pressure vessel which is physically restrained from flying off if released whilst the vessel is pressurised.

SUMMARY OF THE INVENTION

Aspects of the invention relate to an assembly comprising a coupling member and a blanking cap, to a blanking cap, and to a container.

According to a first aspect of the invention, there is provided an assembly including a coupling member defining a flow path, a blanking cap closing the flow path, a seal between the coupling member and the blanking cap, and a clamp, the coupling member having a first annular connection flange extending about an axis, the blanking cap comprising a disc-like member having an outer circumferential region which comprises a second annular connection flange, the first and second connection flanges overlying one another and defining corresponding opposed sealing faces between which the seal is disposed, the first and second connection flanges and seal being clamped together by means of the clamp which engages about the first and second connection flanges, wherein the blanking cap comprises a pair of safety lugs which each extend about an outer circumferential periphery of the first connection flange, each safety lug having an abutment configured for engagement with the first connection flange to limit axial movement of the disc-like member away from the coupling member.

The safety lugs prevent the blanking cap from flying off in the event that the clamp is released whilst the interior of the coupling member is subject to a pressure higher than the ambient pressure. This arrangement is especially advantageous for closing off a port in a pressurised container or other pressurised system.

The first connection flange may have oppositely directed first and second radial faces, wherein the first radial face defines the sealing face and the abutments are configured to engage with the second radial face to limit axial movement of the blanking cap away from the coupling member. The second radial face may be a clamping face and may be angled relative to the first radial face such that the first connection flange tapers, becoming narrower in the axial direction towards its radially outer periphery. The abutments may be spaced from the second radial face when the first and second connecting flanges are clamped firmly together to form a seal. The spacing may be in the region of 2 to 6 mm and more preferably in the region of 3 to 5 mm. The spacing between the abutments and the second radial face may be such that, in use if the clamp is released, the disc-like member is able to move axially away from the coupling member by an amount sufficient to break the seal. The safety lugs are preferably configured such that, in use, if the clamp is released whilst the interior of the coupling member is subject to a pressure higher than the ambient pressure, the pressure inside the coupling member is able to dissipate but without the blanking cap flying off.

Each safety lug may comprise a stop member which defines the abutment. The stop member may be an elongate member. The elongate member may extend longitudinally in a direction generally tangential to a circle drawn about the axis. The elongate member may be straight or it may curve about the axis. The safety lugs may be made of metallic material, such as stainless steel. The safety lugs may be made from plate material. Each safety lug may comprise an attachment portion attached at one end to the disc-like member on the second axial side and a stop member portion at a second end of the attachment portion which defines the stop member. The attachment portion may extend in an axial direction about the circumferential periphery of the first connection flange and the stop member portion may extend in a direction generally orthogonal to a radial direction of the disc-like member. The stop member portion may be located axially in-line with but spaced from the first connection flange. The stop member portion may be an elongate plate-like member having an abutment surface which opposes the first connection flange. The coupling member may have a circular collar portion, the first connection flange being located at one end of the collar. The stop member may extend proximal to but spaced from the collar. The stop member may curve about the collar. The safety lugs may be located about the disc-like member diametrically opposite one another.

The sealing faces may each comprise an annular groove and the seal member may comprise a corresponding annular ridge on each of two opposing sides, with each ridge being received in respective one of the grooves.

The clamp may comprise a pair of curved arms which each define a recess for receiving the first and second connection flanges over a circumferential extent of the flanges. The arms may be spaced from the first and second connection flanges in non-contact regions proximal their first and second ends. The safety lugs may each be located within a respective one of the non-contact regions where the arms of the clamp are spaced from the first and second connection flanges. The clamp may be a split-ring clamp. In an embodiment, the arms each have a first and a second end, the arms being connected at their first ends for pivotal movement relative to one another, the clamp having a catch for releasably connecting the arms at their send ends. The catch may have a mechanism for adjustably drawing the second ends of the split-ring clamp arms towards each other.

The coupling member may comprise a tri-clamp ferrule and the clamp may comprise a tri-clamp.

The coupling member may be provided on a port of a container. The container may be a powder container and may be configured for holding powders used in additive layer manufacturing (ALM) or additive manufacturing (AM). The container may be a pressure vessel in which powder is held together with a quantity of pressurised gas.

The assembly may include a tether for attaching the blanking cap to the coupling member or to some other fix anchor point.

In accordance with a second aspect of the invention, there is provided a blanking cap for use in an assembly according to the first aspect of the invention, the blanking cap comprising a disc-like member having a central axis and an outer circumferential region which comprises an annular connection flange having a sealing face on a first axial side, the blanking cap also comprising a pair of safety lugs, each lug extending axially beyond the sealing face on said first side and having an abutment which is positioned axially in-line with but spaced from the sealing face.

The sealing face may be a first radial face of the connection flange. The connection flange may have a second radial face on a second axial side opposite from the first. The second radial face may be a clamping face and may be angled relative to the first radial face such that the connection flange tapers, becoming narrower in the axial direction towards its radially outer periphery.

The safety lugs may be made of metallic material, such as stainless steel. The safety lugs may be made from plate-like material. Each safety lug may comprise an attachment portion attached at one end to the disc-like member and a stop member portion at a second end of the attachment portion, the stop member defining the abutment. The attachment portion may extend in an axial direction and the stop member portion may extend in a direction generally orthogonal to the attachment portion. The attachment portion may be secured to the disc-like member on the second axial side and extend about the circumferential periphery of the connection flange. The stop member portion may be located axially in-line with but spaced from the sealing face of the blanking cap. The stop member portion may be an elongate plate-like member having an abutment surface which opposes the sealing face of the connection flange. The elongate member may extend longitudinally in a direction generally tangential to a circle drawn about the axis and/or which is generally orthogonal to a radial direction of the disc-like member. The elongate member may be straight or it may curve about the axis. The safety lugs may be located about the disc-like member diametrically opposite one another.

The blanking cap may be configured in use to be clamped to a coupling member having a corresponding connection flange by means of a tri-clamp.

The blanking cap may have a flexible tether for securing the cap to a fixed anchor point.

According to a third aspect of the invention, there is provided apparatus including a container for flowable material having a port comprising an assembly according to the first aspect of the invention or a blanking cap according to the second aspect of the invention. The container may be a powder container and may be configured for holding powders used in additive layer manufacturing (ALM) or additive manufacturing (AM). The container may be a pressure vessel in which powder is held together with a quantity of pressurised gas.

The port may be a powder inlet port though which powder is admitted to the container in use.

The apparatus may comprise a tether for securing the blanking cap to the container or some other fixed anchor point.

DETAILED DESCRIPTION OF THE INVENTION

In order that the invention may be more clearly understood one or more embodiments thereof will now be described, by way of example only, with reference to the accompanying drawings, of which:

FIG. 7A is a schematic composite drawing including views in plan and from the side the assembly of FIGS. 1 and 2 illustrating operation of an embodiment of the assembly in which safety lugs on the blanking cap have short stop members when the blanking cap centred on a connection flange of the coupling;

FIG. 7B is a similar to FIG. 7A but illustrating the effect of the blanking cap being knocked off-centre; and FIG. 7C is similar to FIG. 7B but illustrating operation of an alternative embodiment of the assembly in which the safety lugs have longer stop members.

Figure 1:
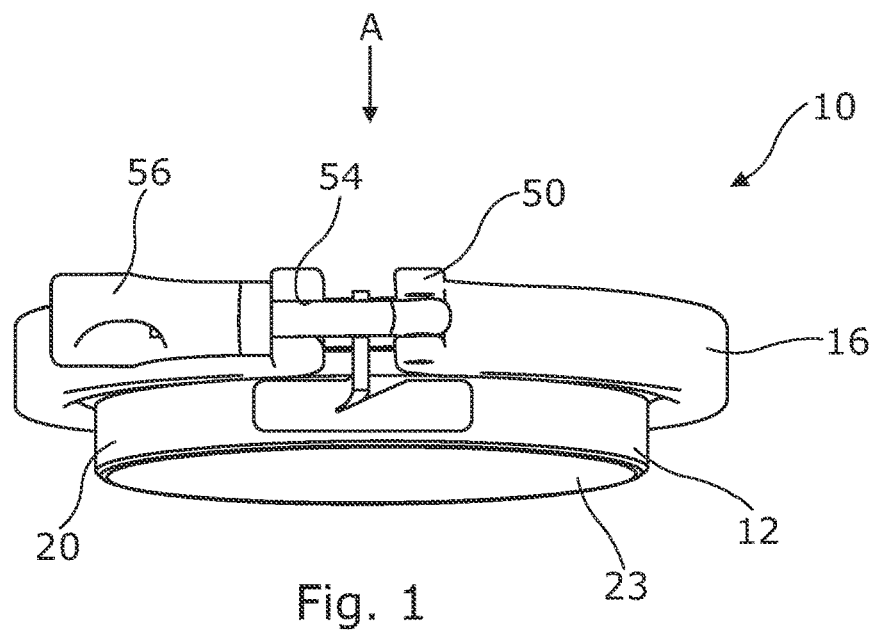
FIG. 1 is a perspective view of an embodiment of an assembly according to an aspect of the present invention.
Figure 2:
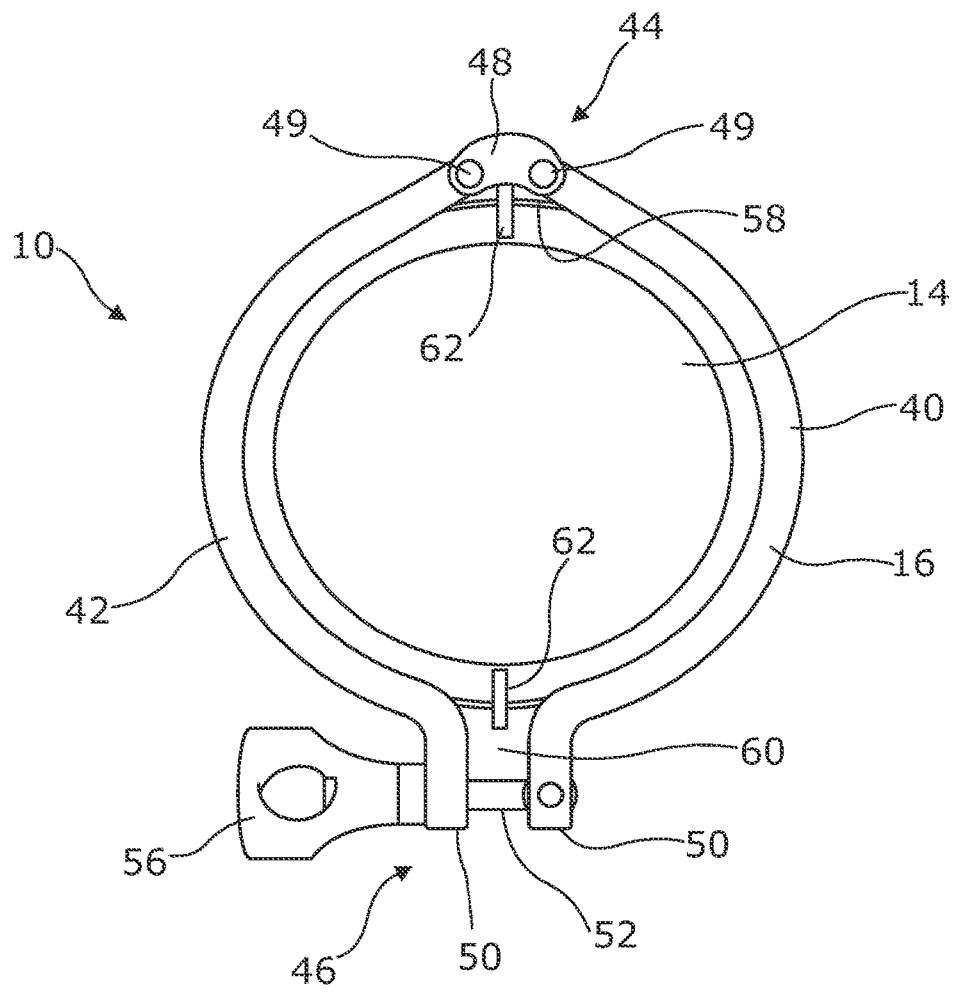
FIG. 2 is a view of the assembly of FIG. 1 taken in the direction of arrow A.
Figure 3:
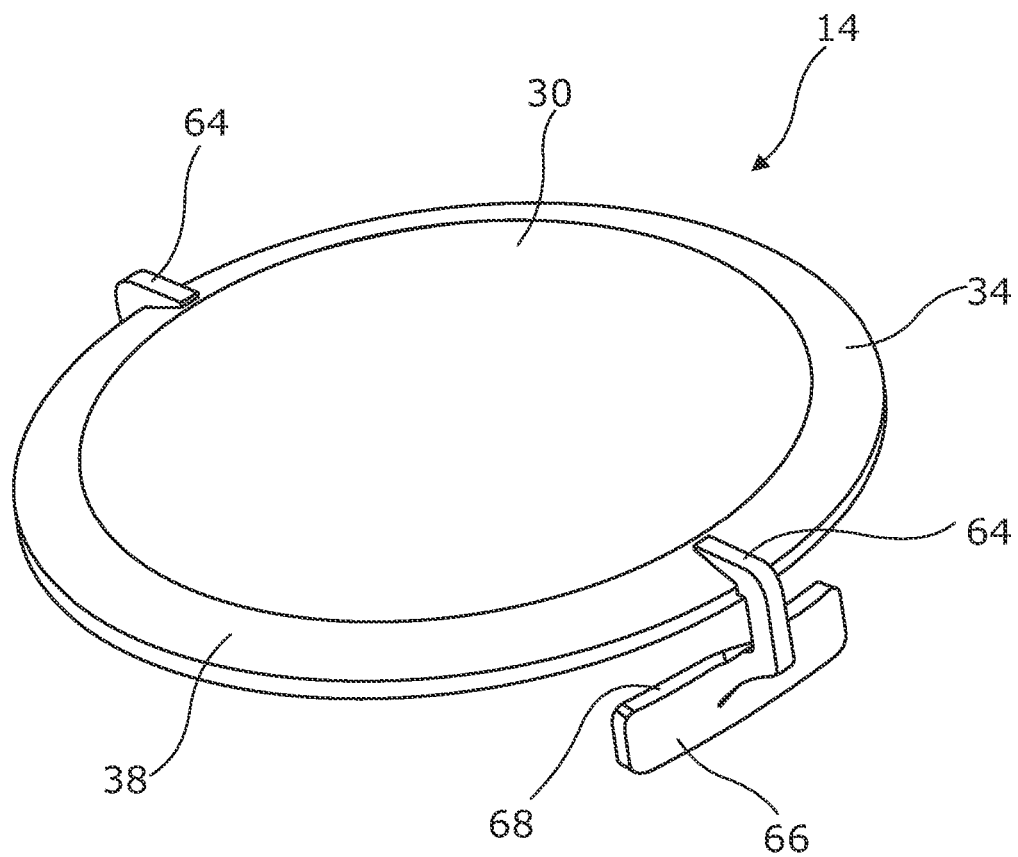
FIG. 3 is a perspective view of an embodiment of a blanking cap according to an aspect of the invention and which forms part of the assembly of FIG. 1.
Figure 4:
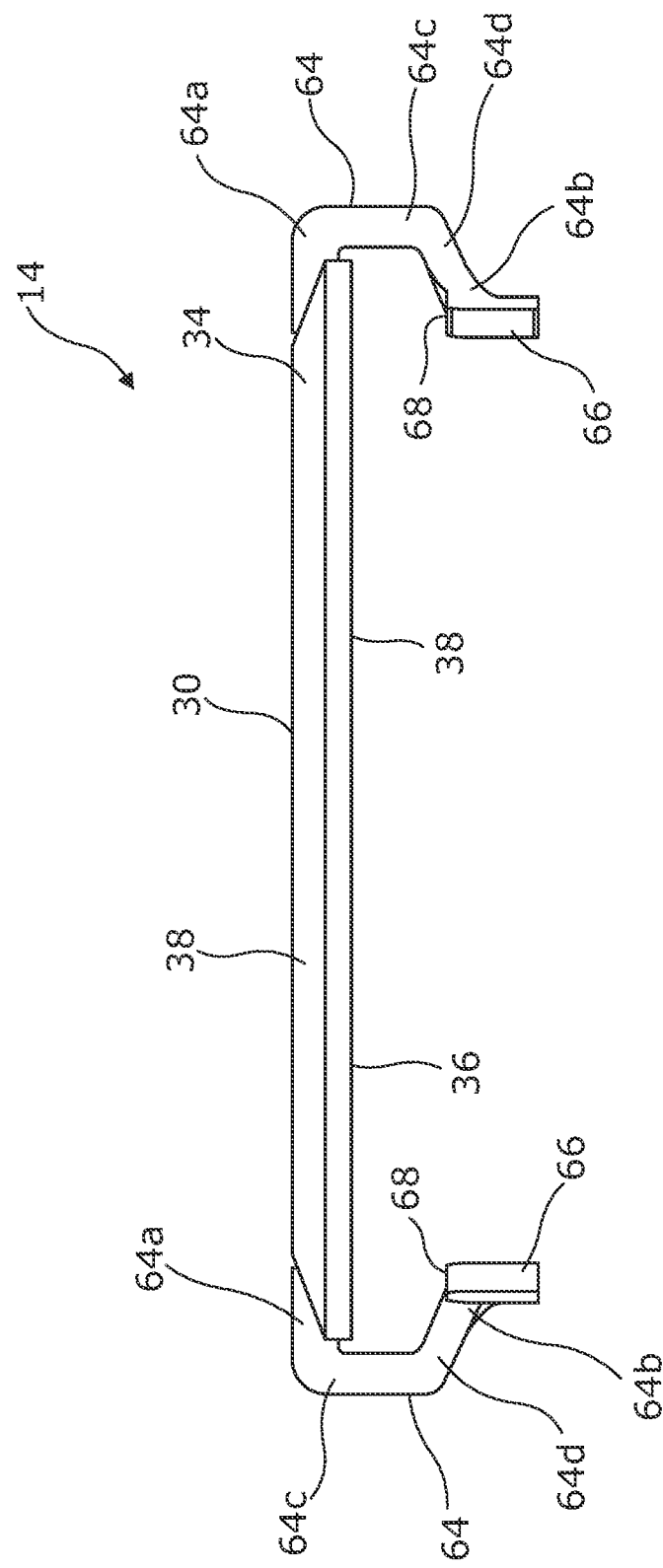
FIG. 4 is a view from the side of the blanking cap of FIG. 3.
Figure 5:
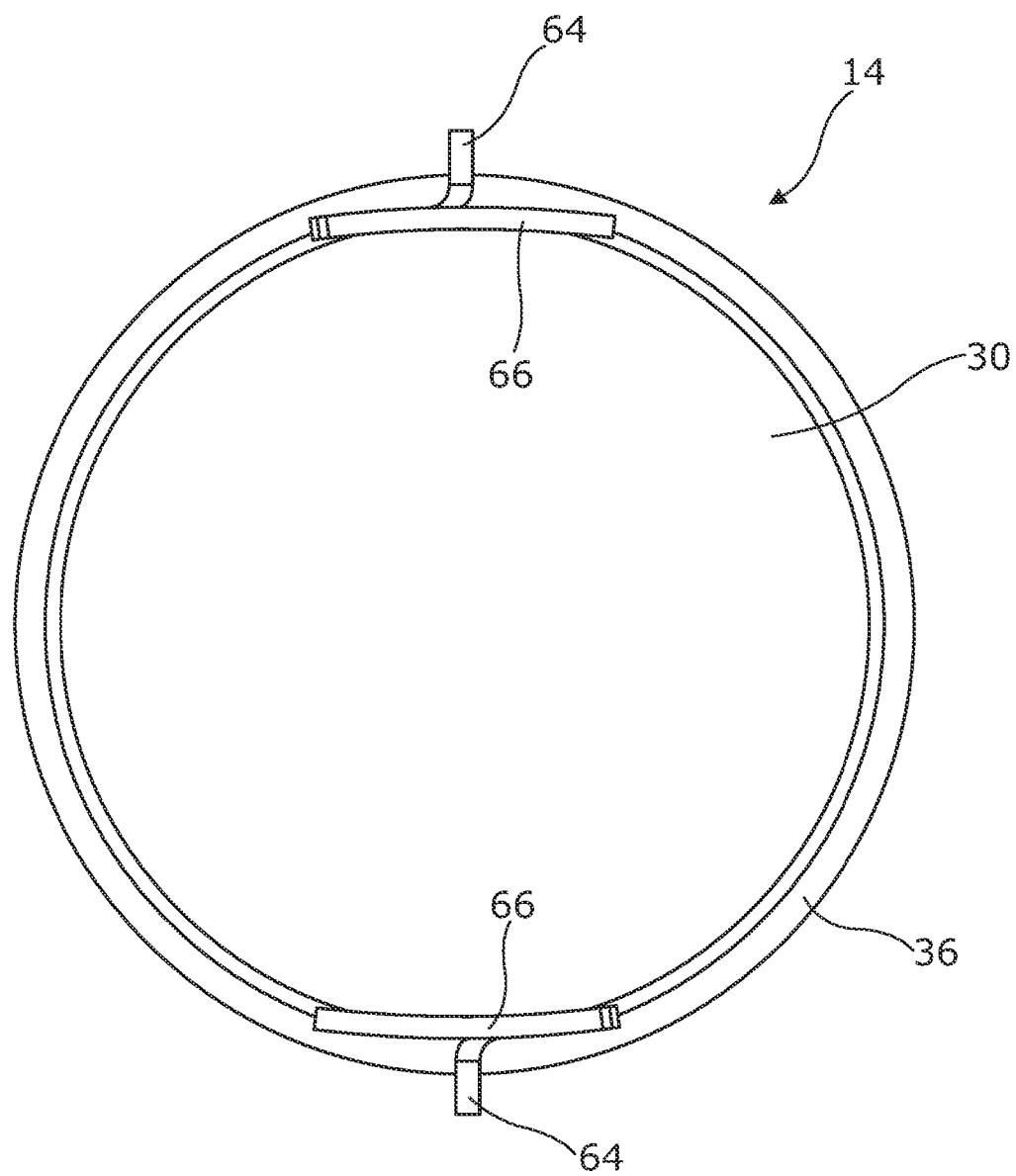
FIG. 5 is a view from below of the blanking cap of FIG. 3.

The invention is directed to arrangement's for blanking a coupling member forming part of flow path for flowable material, where the coupling member is the type comprising an annular radial connection flange. The invention will be described with reference to a tri-clamp type coupling member, to which the invention is particularly suited. However, the invention can be adapted for use with other types of flanged, coupling members.

Reference to flowable material herein should be understood as including gases, liquids, flowable powders and mixtures thereof. For convenience, the term "fluid" will be used to describe such flowable materials.

An assembly 10 in accordance with an embodiment of the invention comprises a coupling member 12, a blanking cap 14, a split-ring clamp 16 and a seal member 18.

The coupling member 12 in this embodiment is a tri-clamp ferrule having an annular, circular collar portion 20 with an annular connection flange 22 at one end. The coupling member has a central axis X (FIG. 6) and is hollow, defining a fluid flow path 23 through the collar and connection flange. In use, the collar portion is mounted to a device so that the coupling member 10 defines a port through which flowable material can flow to enter and/or exit the device. The device could be a conduit but in an advantageous embodiment the coupling member defines or is part of port of a container, especially a container for powders. The port may be an inlet port for admitting powder into the container. The container may be configured for holding specialised powders, such as those used in ALM or AM. The container may be a pressure vessel in which the powder is held under pressure together with a quantity of pressurised gas.

The connection flange 22 has first and second oppositely directed radial faces 24, 26. The first radial face 24 extends generally in a plane orthogonal to the axis X and is a sealing face. The sealing face 24 is planar over the majority of its extent but has an annular groove (not shown) in which a corresponding annular ridge (not shown) in a face of the seal member 18 locates to keep the seal member in position.

The second radial face 26 can be referred to as a clamping face and is angled relative to the first radial face 24 such that the connection flange tapers, becoming thinner in the axial direction towards its outer diameter.

The coupling member 12 can be made of any suitable material. Such materials include metallic materials such as steel, including stainless steel and steel alloys.

The blanking cap 14 has a solid disc-like member 30 which is clamped to the coupling member 12 by the split-ring clamp 14 to close the flow path though the coupling member.

The outer diameter of the blanking cap 12 is substantially the same as that of the connection flange 22 on the coupling member. An outer circumferential region of the disc-like member defines a connection flange 34 which corresponds to the connection flange 22 on the coupling member 12. For clarity, the connection flange 22 on the coupling member 12 will be referred to as a first connection flange and that on the blanking cap as a second connection flange 34. The second connection flange 34 is essentially a mirror image of the first connection flange 22 having first and second oppositely directed radial faces 36, 38. The first radial face 36 extends generally in a plane orthogonal to the axis X of the coupling member, which is coincident with a central axis of the blanking cap when the blanking cap is mounted centrally to the coupling member, and is a sealing face. The sealing face 36 is planar over the majority of its extent but has an annular groove (not shown) in which a corresponding annular ridge (not shown) in a face of the seal member 18 locates to keep the seal member in position. The second radial face 38 can be referred to as a clamping face and is angled relative to the first radial face 36 such that the second connection flange tapers, becoming thinner in the axial direction towards its outer diameter.

In use, the blanking cap 14 is positioned co-axially on the coupling member 12 so that the first and second connection flanges 22, 34 overlap one another, with the sealing faces 24, 36 directed towards each other. The seal member 18 is positioned between the sealing faces 24, 36 so that the ridges on the seal member engages in the annular groves to locate the seal member. In alternative embodiments, the seal does not have ridges and there are no grooves in the sealing faces or the seal may have only one ridge and only one of the sealing faces has a corresponding groove.

The connection flanges 22, 34 and seal member are clamped together by means of the split-ring clamp 16, which in this embodiment is a tri-clamp. Tri-clamp type are well known and so the clamp 16 not be described in detail. However, briefly the split-ring clamp 16 has a pair of curved arms 40, 42 which are connected together at a first end by a hinge mechanism 44 and has a catch mechanism 46 for releasably connecting the other, second ends of the arms. The hinge mechanism 44 in this case comprises a hinge member 48 to which each hinge arm is pivotally connected by means of a hinge pin 49 to enable the arms to be moved radially (relative to the axis X of the coupling member and blanking cap) between open and closed positions. In the catch mechanism 46, the arms have radially outwardly extending catch portions 50 at their second ends distal from the hinge mechanism 44. The catch portions overlie one another when the arms are in the closed position. A threaded stud 52 is pivotably connected to the catch portion 50 of one of the arms 40. The catch portion 50 of the other of the arms 42 has a U-shaped slot 54 which opens at the distal (free) end of the catch portion into which the stud can be inserted. A locking knob 56 has a threaded bore in which the threaded stud 52 is received so that the locking knob can be twisted to move it axially along the stud. The knob 56 is unable to pass through the U-shaped slot 54. To open the clamp, the knob 56 is unscrewed until the stud 52 can be released from the U-shaped slot 54. The arms 40, 42 can then be pivoted to the open position and located about the first and second connection flanges 22, 34. The arms 40, 42 are closed so that the flanges 22, 34 are engaged within the recess of the arms, with the arms contacting the second, clamping faces 26, 38 of the connection flanges. When the arms are closed sufficiently, the stud 52 is re-engaged in the U-shaped slot 54 in the catch portion of the arm 42 with the knob 56 on the outside to prevent the arms from being able to pivot open. To firmly clamp the connection flanges together, the locking knob 56 is screwed further onto the stud 52 drawing the ends of the arms 40, 42 radially closer together. This forces the connection flanges 24, 34 further into the recess in the arms. As the arms move further up the tapered second radial faces 26, 38 of the connection flanges, the connection flanges are moved axially closer together, compressing the seal member 18 between the sealing faces of the connection flanges until a gas tight seal is formed and the flow path is fully closed. Each arm 40, 42 engages the connection flanges 22, 34 over a limited circumferential extent. However, the arms 40, 42 do not engage the connection flanges in regions 58, 60 close to their first and second ends adjacent the hinge mechanism 44 and the catch 46. These regions 58, 60 where the arms are spaced from the connection flanges 22, 34 will be referred to as "non-contact regions".

As so far described, the blanking arrangement is largely conventional. As previously discussed, a potential issue with the known blanking arrangement arises where it is used to close a coupling member on a pressurised system where the pressure inside the coupling member is higher than that outside. If a user were to release the clamp 16 without first reducing the pressure inside the coupling member, the blanking cap may fly off, potentially causing injury. To address this issue, and in accordance with an aspect of the present invention, the blanking cap 14 is provided with a pair of safety lugs 62. The safety lugs 62 are arranged so that in the event the split-ring clamp 16 is released whilst the interior of the coupling member is at a higher pressure than the ambient pressure outside, they engage the first connection flange 22 of the coupling member to limit the amount by which the interior pressure can lift the blanking cap 14 axially away from the coupling member 12. This prevents the blanking cap from flying off and so reduces the risk of injury. In a particularly advantageous arrangement, the safety lugs 62 are arranged to allow the blanking cap to lift axially away from the first connection flange 22 by a sufficient distance that the seal between the blanking cap 14 and the coupling member 12 is broken, allowing the system to de-pressurise whilst restraining the blanking cap from flying off uncontrollably.

The safety lugs 62 are located on the disc-like member 30 diametrically opposite one another and are configured so that they can locate within the non-contact regions 58, 60 where the arms 40, 42 of the split-ring clamp 16 are spaced from the connection flanges 22, 34. This enables the blanking cap 12 to be used with a conventional split-ring clamp 16. However, in an alternative embodiment the split-ring clamp could be specifically designed for use with a blanking cap 12 in accordance with the invention with the arms suitably shaped to accommodate the safety lugs 62. Indeed, the invention is not limited to use of a split-ring clamp and any suitable clamping arrangement can be used, provided the safety lugs are accommodated.

Each safety lug 62 has an attachment portion 64 and a stop member portion 66. The attachment portion 64 is secured to the disc-like member 30 at a first end 64a and the stop member portion 66 is located at a second end 64b of the attachment portion. In this embodiment, the attachment portion is secured to the clamping face 38 of the disc-like member on the axial side of the disc-like member that faces away from the coupling member in use. The attachment portion 64 is profiled to extend about the outer periphery of the disc-like member 30 and has an axially directed region 64c which projects in an axial direction beyond the sealing face of the 36 and an angled region 64d which is directed axially and radially inwardly so that the second end 64b of the attachment portion and the stop member portion 66 lie axially in-line with but spaced from the sealing face 36 of the blanking cap. As seen best in FIG. 6, the attachment portion 64 is profiled so as to locate about the first connection flange 22 of the coupling member 12 with a small clearance. The arrangement is configured so as to position the second end 64b of the attachment portion and the stop member 66 axially in-line with but spaced from the clamping face 26 of the first connection flange 22 on the coupling member 12 when the blanking cap is clamped in position.

Figure 6:
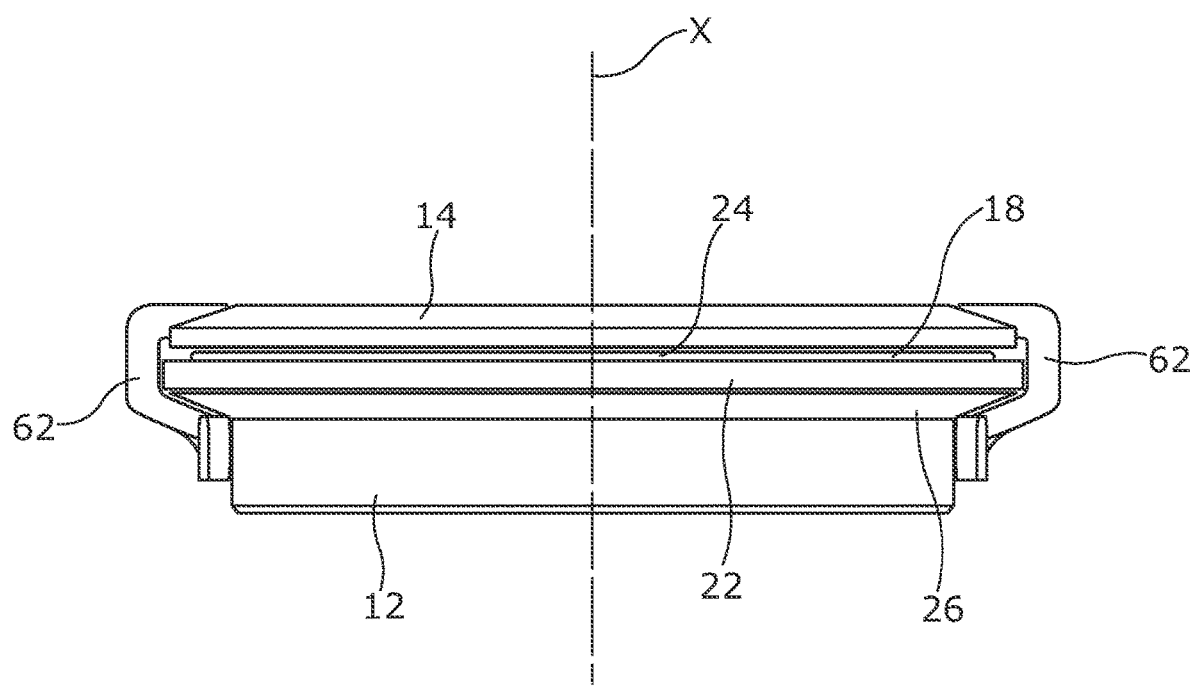
FIG. 6 is a view from the side of the assembly of FIG. 1 illustrating how axial movement of a blanking cap relative to a coupling member is limited, a split-ring clamp which forms part of the assembly is omitted for clarity.

The stop member portion 66 in this embodiment is an elongate curved, plate-like member which extends longitudinally in a circumferential direction about the axis X so as to locate about the collar portion 20 of the coupling member with a small clearance. An upper edge 68 of the stop member portion defines an abutment surface which in use engages the clamping surface 26 of first connection flange 22 to limit axial movement of the blanking cap away from the first connection flange 22 of the coupling member. When the blanking cap 12 is clamped to the coupling member, there is a clearance between the abutment surface 68 and the first connection flange 22 to allow for assembly of the blanking cap to the coupling member. Advantageously, the clearance allows the disc-like member 30 of the blanking cap to move axially away from the first connection flange 22 of the coupling member by a limited amount which is sufficient to break the seal between the blanking cap and the coupling member 12 as illustrated in FIG. 6. FIG. 6 shows how the disc-like member 30 can be axially displaced away from the sealing face 24 of the first connection flange before the abutment surfaces 68 on the lugs engage with the first connection flange 22 to allow the pressure inside the coupling member to dissipate. A clearance between the abutment surface 88 and the first connection flange 22 in the region of 2 to 6 mm and more preferably in the region of 3 to 5 mm may be provided. It will be appreciated that in practice the disc-like member 30 may not remain parallel to the first connection flange 22 if the clamp is removed whilst the system is pressurised but may tilt away on one side more than another until restrained by the stop members. Reference to the disc-like member moving axially away from the connection flange should be interpreted accordingly.

In the present embodiment, the safety lugs 62 are each manufactured from a single piece of plate material, which is shaped to define the attachment and stop member portions 64, 66 and is affixed to the disc-like member. Initially attachment and stop member portions 64, 66 are co-planer and the plate material is bent so that the plane of the stop member portion is aligned generally orthogonal to the plane of the attachment portion. The safety lugs 62 can be manufactured from any suitable material and affixed to the disc-like member in any suitable manner. However, in the present embodiment the disc-like member 30 and the safety lugs 62 are both manufactured from compatible metallic materials, for example stainless steel, and the safety lugs 62 are welded to the disc-like member 30. However, the safety lugs 62 could be produced integrally together with the disc-like member, say by means of casting.

To assemble the blanking cap 14 to the coupling member 12, the blanking cap is slid on to the coupling member 12 from one side so that the safety lugs locate about the first connection flange 22 on the coupling member. The seal member 18 may be initially located on the coupling member or on the blanking cap. Once the blanking cap is correctly positioned so that its connection flange 34 overlies the first connection flange 22 of the coupling member and with the seal member 18 in position, the split-ring clamp 16 is fitted with the safety lugs 62 being accommodated within the non-contact regions 58, 60 adjacent the hinge and catch mechanisms 44, 46. The clamp 16 is secured and tightened so that a gas tight seal is produced between the blanking cap 14 and the coupling member 12 and the flow path through the coupling member is fully closed. Where the coupling member 12 is provided on a pressurised system, say on a port of a pressurised container, the system can be used as required with the interior pressurised above the ambient pressure. In the event that the split-ring clamp is released whilst the pressure inside the coupling member is above ambient, the safety lugs prevent the blanking cap 14 from flying off but allow it to move sufficiently that the seal between the cap and coupling member is broken so that the system is able to de-pressurise. Once the system is de-pressurised, the blanking cap and be removed by sliding it off sideways.

The circumferentially extending stop members 66 are advantageous in helping to locate the disc-like member laterally relative to the coupling member by engagement with the collar portion 20 of the coupling member 12. This reduces the risk of the blanking cap being able to disconnect from the coupling member in the event that it is simultaneously struck from the side whilst the system is de-pressurising. The stop members 66 do not have to be curved as shown but could be straight, extending in a direction generally tangentially to a circle drawn about the axis (that is to say in a direction generally orthogonal to a radial direction of the disc-like member). Ideally, the stop members 66 should be sufficiently long that they will engage the first connection flange 22 to prevent the blanking cap flying off even if the blanking cap is knocked sideways out of alignment with the first connection flange 22 as illustrated in FIGS. 7A to 7C

FIGS. 7A and 7B illustrate an embodiment in which the stop members 66 are relatively short when considered in a direction tangential/circumferential to the axis. Provided the disc-like member 30 remains centred on the first connection flange 22 as shown in FIG. 7A, the stop members 66 can engage the first connection flange 22 to limit axial movement of disc-like member 30 and prevent the blanking cap flying off. However, if the disc-like member 30 is deflected off-centre sufficiently as shown in FIG. 7B, the stop members 66 will no longer contact the first connection flange 22 to prevent disc-like member moving axially away from the first connection flange 22 and the blanking cap is able to fly-off. The use of longer stop members 66 as shown in FIG. 7C reduces the risk of this happening as the stop members are able to contact the first connection flange 22 to limit axial movement of the disc-like member 30 axially away from the first connection flange 22 over a wider range of misalignment between the disc-like member and the first connection flange 22. This increases safety, reducing the risk of the blanking cap flying off even when knocked sideways with the clamp released. Preferably the stop members are configured so as to be operative to engage the first connection flange 22 to limit axial movement of the disc-like member away from the connection flange when the disc-like member off-centre radially of the first connection flange 22 by up to 50%, or 40%, or 30%, or 25%. Whilst this is advantageous, it is not always an essential requirement and the safety lugs 62 can be any suitable shape so long as they engage the coupling to inhibit axial movement of the blank cap away from the coupling member at least whilst the disc-like member is generally centred on the connection flange.

As an additional safety feature, a tether may be attached to the blanking cap and secured to the coupling member or to some other fixed location, say elsewhere on a container. The tether is sufficiently strong in the tension to restrain the blanking cap in the event that safety lugs 62 fail to retain the blanking cap on the coupling member for some reason.

Whilst the blanking cap arrangement according to the present invention is particularly suitable for closing off a port in a pressurised container, it can be used with to close off a coupling in any system for containing flowable material, especially where the system is pressurised.

The one or more embodiments are described above by way of example only. Many variations are possible without departing from the scope of protection afforded by the appended claims.

The invention claimed is:

1. An assembly including a coupling member defining a flow path, a blanking cap closing the flow path, a seal between the coupling member and the blanking cap, and a clamp, the coupling member having a first annular connection flange extending about an axis, the blanking cap comprising a disc-like member having an outer circumferential region which comprises a second annular connection flange, the first and second connection flanges overlying one another and defining corresponding opposed sealing faces between which the seal is disposed, the first and second connection flanges and seal being clamped together by means of the clamp which engages about the first and second connection flanges, wherein the blanking cap comprises a pair of safety lugs which each extend about an outer circumferential periphery of the first connection flange, each safety lug having an abutment configured for engagement with the first connection flange to limit axial movement of the disc-like member away from the coupling member, and wherein the abutments are spaced from the first connection flange when the first and second connecting flanges and seal are clamped sufficiently to form a seal.

2. The assembly as claimed in claim 1, wherein the first connection flange has oppositely directed first and second radial faces, wherein the first radial face defines one of said opposed sealing faces and the safety lug abutments are configured to engage with the second radial face.

3. The assembly as claimed in claim 1, wherein spacing between the abutments and the first connection flange is such that, in use, if the clamp is removed or released, the disc-like member is able to move axially away from the coupling member by an amount sufficient to break the seal.

4. The assembly as claimed in claim 1, wherein each safety lug comprises a stop member which defines the abutment, the stop member being an elongate member extending longitudinally in a direction which is generally tangential to a circle drawn about the axis and/or which curves about the axis.

5. The assembly as claimed in claim 1, wherein each safety lug comprises a stop member which defines the abutment, wherein the stop member comprises a plate-like member having an abutment surface which faces the first connection flange.

6. The assembly as claimed in claim 1, wherein each safety lug comprises an attachment portion attached at one end to the disc-like member and a stop member portion which defines the stop member at a second end of the attachment portion, the stop member portion being located axially in-line with but spaced from the first connection flange.

7. The assembly as claimed in claim 1, wherein the clamp comprises a pair of curved arms which each define a recess for receiving the first and second connection flanges over a circumferential extent of the flanges, the arms being spaced from the first and second connection flanges in non-contact regions and wherein the safety lugs are each located within a respective one of the non-contact regions.

8. The assembly as claimed in claim 7, wherein the clamp is a split-ring clamp, each arm having a first and a second end, the arms being connected at their first ends for pivotal movement relative to one another, the clamp having a catch for releasably connecting the arms at their send ends, and wherein the non-contact regions are located at the first and second ends of the arms.

9. The assembly as claimed in claim 1, wherein the coupling member comprises a tri-clamp ferrule and the clamp comprises a tri-clamp.

10. The assembly as claimed in claim 1, wherein the coupling member is provided on a port of a container.

11. A blanking cap for use in an assembly according to claim 1, the blanking cap comprising the disc-like member having a central axis and an outer circumferential region which comprises an annular connection flange having the sealing face on a first axial side, the blanking cap also comprising the pair of safety lugs, each lug extending axially beyond the sealing face on said first axial side and having the abutment which is positioned axially in-line with but spaced from the sealing face and wherein the sealing face is a first radial face of the connection flange, the connection flange having a second radial face on a second axial side opposite from the first, the second radial face being angled relative to the first radial face such that the connection flange tapers, becoming narrower in the axial direction towards its radially outer periphery.

12. The blanking cap as claimed in claim 11, wherein each safety lug comprises an attachment portion attached at one end to the disc-like member and a stop member portion at a second end of the attachment portion, the stop member portion defining the abutment.

13. The blanking cap as claimed in claim 12, wherein the attachment portion extends in an axial direction, the stop member portion member being an elongate member extending generally in a direction tangential to a circle drawn about the axis and/or which is curved about the axis.

14. The blanking cap as claimed in claim 12, wherein the stop member portion is an elongate plate-like member having an abutment surface which faces the sealing face of the connection flange.

15. The blanking cap as claimed in claim 11, wherein the attachment portion is secured to the disc-like member on the second axial side and extends about the circumferential periphery of the connection flange.

16. Apparatus including a container having a port comprising an assembly according to claim 1.

17. The apparatus as claimed in claim 16, wherein the container is a container configured to hold powder together with a quantity of pressurised gas.

* * * * *